United States Patent [19]

Hayes et al.

[11] Patent Number: 4,581,783
[45] Date of Patent: Apr. 15, 1986

[54] BASE CONSTRUCTION FOR THREADING MACHINES

[75] Inventors: Robert J. Hayes, Westlake; James C. Redman, Amherst; Erich Netzel, Bay Village, all of Ohio

[73] Assignee: Emerson Electric Co., St. Louis, Mo.

[21] Appl. No.: 691,383

[22] Filed: Jan. 14, 1985

[51] Int. Cl.⁴ ............................................. B23G 1/00
[52] U.S. Cl. .................................... 10/89 R; 408/74; 408/234
[58] Field of Search ...................... 408/73, 74, 28, 105, 408/106, 234, 124; 82/28, 30, 40, 48, 101, 102; 10/110, 111, 113, 123 R, 89 R, 87, 107 R, 107 PH

[56] References Cited

U.S. PATENT DOCUMENTS

| | | | |
|---|---|---|---|
| 1,707,456 | 4/1929 | Bourne | 10/89 R |
| 2,890,880 | 6/1959 | Damijonaitis | 279/35 |
| 2,916,290 | 12/1959 | Skillin | 279/106 |
| 3,232,629 | 2/1966 | Obear | 279/106 |
| 4,030,385 | 6/1977 | Scholin et al. | 82/101 |

OTHER PUBLICATIONS

Ridge Tool Company, Catalog RT-580, Oct. 1982, pp. 34-38, 40, 42 and 43.

*Primary Examiner*—Neil Abrams
*Attorney, Agent, or Firm*—Body, Vickers & Daniels

[57] ABSTRACT

A base for supporting a rotatable spindle shaft and chuck assembly of a motor driven threading machine for rotation about a spindle axis is comprised of axially spaced apart upright support members transverse to the spindle axis and rigidly interconnected by means of a torque tube having opposite ends welded thereto. The spindle shaft, which carries chuck units on opposite ends thereof, extends through the torque tube and is rotatably supported by bearings adjacent the upright support members. A pair of support rails extend through openings therefor in the support members and have ends extending radially outwardly from one of the support members to provide a cantilever support arrangement for the tooling carriage of the threading machine. Additionally, the support members, portions of the support rails therebetween, and the torque tube facilitate the mounting of drive motor and gear box units for the machine.

18 Claims, 4 Drawing Figures

BASE CONSTRUCTION FOR THREADING MACHINES

BACKGROUND OF THE INVENTION

The present invention relates to the art of power driven threading machines and, more particularly, to an improved base construction for such machines.

Power driven threading machines are of course well known and heretofore have included a one-piece cast aluminum base having opposite ends between which the various component parts of the machine are supported. More particularly in this respect, a spindle shaft is supported on the base by axially spaced apart bearing assemblies, and the shaft has an outer end which carries a centering chuck and an inner end which carries a chuck assembly by which a workpiece to be threaded is gripped and rotated. Tooling for cutting, reaming and threading a workpiece is supported on a carriage displaceable toward and away from the latter chuck along a pair of support rails. The cast base is basically a box-like structure having upright side walls and end walls and an intermediate wall between the end walls. The intermediate wall and one of the end walls provide cradles for the bearings supporting opposite ends of the spindle shaft, and the tooling carriage rails are supported between the intermediate wall and the other end wall of the base.

While threading machines having cast base constructions of the type described above are generally satisfactory in operation, the base casting has necessarily been large and heavy to accommodate the various component parts and, in particular, to enable the base to resist the torque and deflection forces imposed thereon during cutting, reaming and threading operations. The torque and deflection loads from such operations are applied primarily at the point of the front spindle shaft bearing and on the carriage support rails. It will be appreciated that the engagement between fixed tooling and a workpiece rotating about an axis offset from the carriage support rails and the side walls of the base produces a torque loading which tends to longitudinally twist the box-like base. A cast aluminum base having the required stiffness to resist such torsional loading, as well as deflection loading applied primarily between the front bearing and carriage support rails, weighs about 65 pounds in connection with a machine capable of threading workpieces up to 2 inches in diameter, and weighs well over 100 pounds in connection with a machine capable of threading workpieces between 2½ inches and 4 inches in diameter. In addition to the undesirable size and weight characteristics, the amount of material required for the casting renders the base component undesirably expensive.

SUMMARY OF THE INVENTION

In accordance with the present invention, a threading machine base construction is provided which advantageously resists torque and deflection forces more efficiently than the cast one-piece base heretofore used, thus enabling a significant reduction in the amount of material required for the base and thus the size and weight of the base as well as the overall size and weight of the threading machine. More particularly in accordance with the present invention, a threading machine base is defined by a pair of spaced apart upright support members which are rigidly interconnected with one another by means of a torque tube which receives the spindle shaft and, together with the support members, supports the spindle shaft and chuck assembly for rotation about the machine axis.

Preferably, the support members are cast aluminum and the torque tube is an aluminum extrusion having opposite ends welded to the support members. The torque tube advantageously provides a structural component which, through its coaxial and close relationship to the machine axis and its rigid interconnection with the upright support members, efficiently resists the torque and deflection loads and distributes such loads between the support members and torque tube. More particularly in this respect, the efficiency with which torque and deflection loading is resisted by a base construction in accordance with the present invention is evidenced by the fact that the support member and torque tube components defining the base have a total weight of 40 pounds in connection with a machine capable of threading workpieces from ½ inch to 4 inches in diameter. In comparison with the one-piece cast base described above, this represents a significant reduction in the amount of material required and, thus, in the size and cost of the base.

A base construction according to the present invention also enables the use of a unique support rail arrangement for the tool carriage of a threading machine and which arrangement advantageously promotes compactness of the machine as well as a further reduction in total weight of the machine in comparison with previous machines having a one-piece base. More particularly in this respect, the support rails extend between the upright support members and through and axially outwardly of one of the support members to provide a cantilever arrangement for supporting the tool carriage of the threading machine. Both compactness and light weight are promoted by eliminating the need for support for the rail members at the outermost ends thereof and which support, with previous machines, was provided by side and end portions of the cast one-piece base. Additionally, compactness, lightness in weight and economy of production are advantageously promoted by utilizing the portions of the support rails between the upright support members, and the support members and torque tube, for the mounting and support of the drive motor and gear box units of the threading machine.

It is an outstanding object of the present invention to provide an improved base construction for supporting the component parts of a power driven threading machine.

Still another object is the provision of a threading machine base which resists torque and deflection forces produced by various machine operations more efficiently than base constructions heretofore available.

Another object is the provision of a threading machine base which enables a significant reduction in both the amount of material required for the base and in the size and weight of the base.

A further object is the provision of a threading machine base which enables the production of a power driven threading machine which is more compact, lighter in weight and more economical to produce than threading machines of comparable capacity heretofore provided.

Still a further object is the provision of a power driven threading machine having a base construction which facilitates cantilever support of the tooling carriage of the machine, thus to promote compactness and lightness of weight of the machine as well as the economical production thereof.

Yet another object is the provision of a threading machine base comprised of a pair of spaced apart support members rigidly interconnected by means of a torque tube therebetween and which construction enables the base to resist torque and deflection loads more efficiently than heretofore possible, and enables a significant reduction in the amount of material required for the base and therefore the size and weight of the base.

BRIEF DESCRIPTION OF THE DRAWINGS

The foregoing objects will in part be obvious and in part pointed out more fully hereinafter in conjunction with the written description of a preferred embodiment of the invention illustrated in the accompanying drawings in which.

DESCRIPTION OF A PREFERRED EMBODIMENT

Referring now in greater detail to the drawings wherein the showings are for the purpose of illustrating a preferred embodiment of the invention only and not for the purpose of limiting the invention, a power driven threading machine base according to the present invention is comprised of a pair of support members 10 and 12 axially spaced apart and transverse to the threading machine axis A, and a torque tube 14 which is coaxial with axis A and has its opposite ends rigidly connected to support members 10 and 12. Preferably, each of the support members 10 and 12 is of cast aluminum, and torque tube 14 is an extruded aluminum tube having its opposite ends welded to the corresponding one of the support members as set forth hereinafter.

Figure 1:
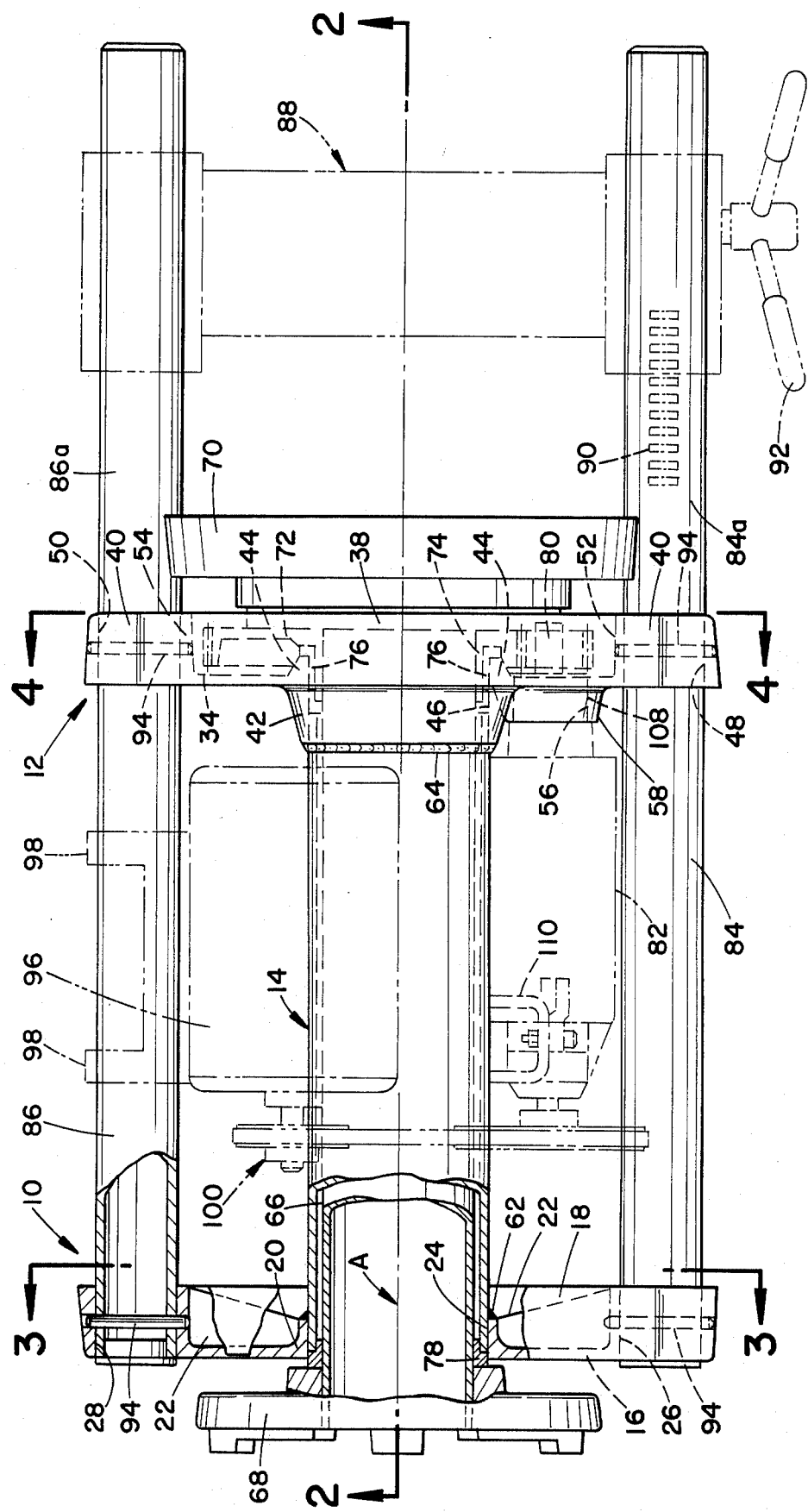
FIG. 1 is a plan view of a threading machine base constructed according to the present invention and somewhat schematically showing component parts of a threading machine as structurally associated therewith.
Figure 2:
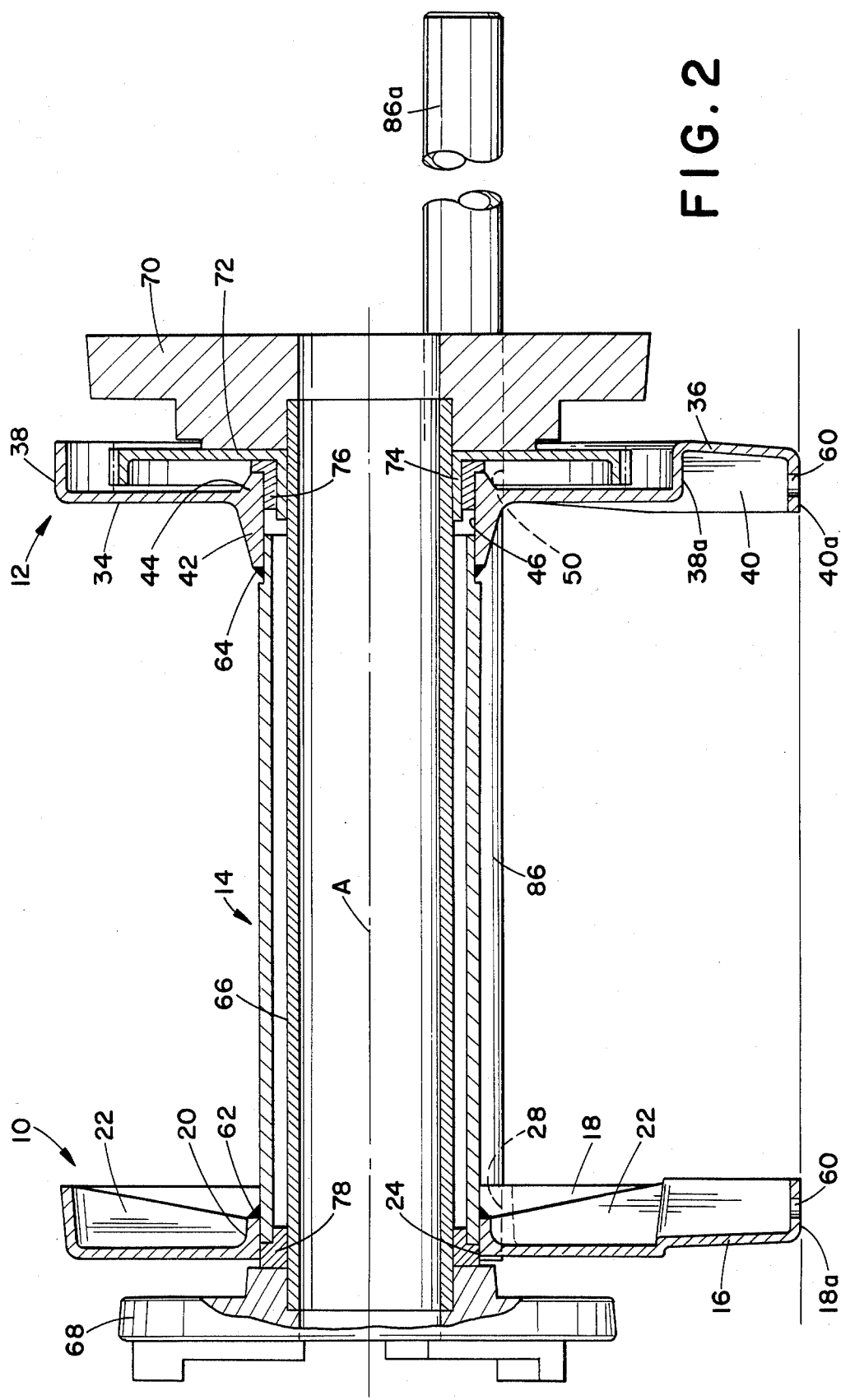
FIG. 2 is a sectional elevation view of the base taken along line 2—2 in FIG. 1.
Figure 3:
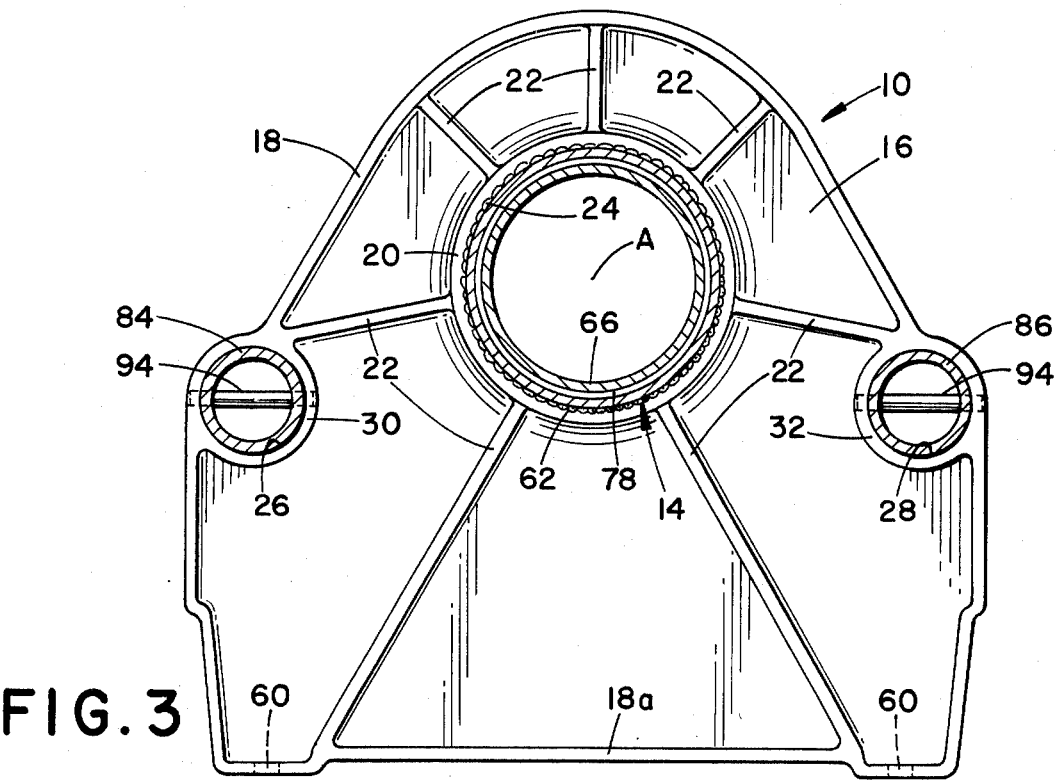
FIG. 3 is a cross-sectional elevation view of the base taken along line 3—3 in FIG. 1; and, FIG. 4 is an end elevation view of the base construction, partially in section, and looking in the direction of line 4—4 in FIG. 1.

As best seen in FIGS. 1, 2 and 3, support member 10 basically includes a vertical wall portion 16 and an axially extending flange 18 which is peripherally continuous thereabout, an annular hub portion 20 extending axially toward support member 12, and a plurality of reinforcing ribs 22 extending generally radially with respect to axis A from hub portion 20 to flange 18. Hub portion 20 is provided with an opening 24 which extends through support member 10 coaxial with axis A. Support rail openings 26 and 28 are provided through support member 10 on laterally opposite sides of axis A, and these openings are defined by arcuate inner flange segments 30 and 32, respectively, and the corresponding portion of flange 18 outwardly adjacent thereto.

Figure 4:
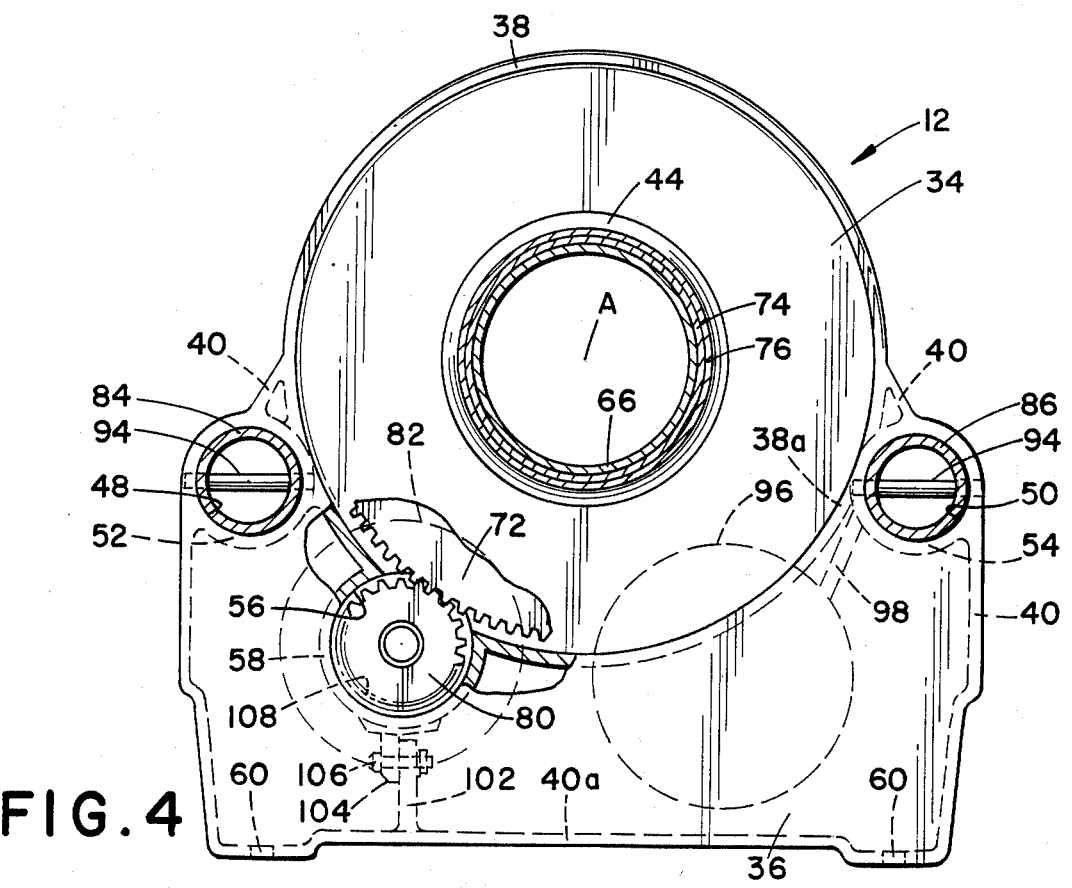

Support member 12 is basically defined by vertically extending wall portions 34 and 36 which, as best seen in FIGS. 2 and 4, are axially offset from one another. Wall portion 34 is circular with respect to axis A and is bounded by an axially extending flange 38 having a lower portion 38a by which wall portion 34 is axially interconnected with wall portion 36. Wall portion 34 and flange 38 provide a recess in support member 12 facing axially outwardly of the corresponding end of the base construction for the purpose set forth hereinafter. An axially extending flange 40 is provided about the periphery of wall portion 36 and has opposite ends merging with the corresponding area of flange 38. Support member 12 further includes a hub portion 42 coaxial with axis A and extending toward support member 10, and a hub portion 44 extending in the axially opposite direction. Hub portions 42 and 44 are provided with an opening 46 extending through support member 12 coaxial with axis A.

In a manner similar to that described hereinabove with regard to support member 10, a pair of openings 48 and 50 are provided through support member 12 on laterally opposite sides of axis A, and these openings are respectively defined by arcuate inner flange segments 52 and 54 and the corresponding portion of flange 40 outwardly adjacent thereto. For the purpose which will become apparent hereinafter, support member 12 further includes an axially extending opening 56 therethrough and the periphery of which opening intersects both wall portions 34 and 36 and the portion of flange 38a therebetween. Opening 56 is bounded by an axially extending flange 58 having portions extending axially inwardly toward support member 12 from the corresponding one of the wall portions 34 and 36. Flanges 18 and 40 of the support members have bottom portions 18a and 40a, respectively, each of which is provided with a pair of openings 60 therethrough to facilitate mounting of the base and thus the threading machine on a suitable support stand, workbench or the like.

Torque tube 14 has its opposite ends respectively received in openings 24 and 46 of support members 10 and 12, and the ends of the torque tube are welded to hub portions 20 and 42 by peripheral welds 62 and 64, respectively. In the embodiment illustrated, the base is designed for a threading machine capable of handling workpieces from ⅛ inch to 4 inches in diameter. In connection with providing such capability, the walls and flanges of support members 10 and 12 and the reinforcing ribs of support member 10, are about ¼ inch thick, and the flanges have an axial width of about 2 inches. Further, torque tube 14 has a wall thickness of about ¼ inch and an outside diameter of about 6 inches, and the base has a length of about 23 inches, a width of about 19 inches and a height of about 18 inches.

When the support members and torque tube are rigidly interconnected in the foregoing manner, they provide a base construction for rotatably supporting the spindle shaft and chuck assembly of a power driven threading machine. The latter assembly is somewhat schematically shown in FIGURES 1 and 2 of the drawing as comprising a spindle shaft 66 extending through torque tube 14 and openings 24 and 46 of the support members coaxial with axis A, a rear or centering chuck 68 on one end of the spindle shaft, and a front or driven chuck 70 on the other end of the spindle shaft. The structure and function of chucks 68 and 70 is well known and does not form a part of the present invention, whereby a detailed disclosure and description thereof is not necessary. For purposes of the present invention it will be sufficient to understand that a workpiece to be machined, such as a rod or tube, is received in spindle shaft 66 with the end to be machined axially outwardly adjacent chuck 70. Chuck 68 serves to center the workpiece coaxial with axis A, and chuck 70 operates to center the corresponding end of the workpiece coaxial with axis A and to grip the workpiece for the latter to be rotated during the machining operations. As is further well known in connection with power driven threading machines, rotation of shaft 66 and chucks 68 and 70, and thus the workpiece, is achieved by means of an annular gear 72 suitably attached to chuck 70 and to the spindle shaft for rotation of the gear to in turn rotate the shaft, chucks and workpiece. In the embodiment illustrated, gear 72 has an annular hub portion 74 suitably secured to spindle shaft 66, and an annular bearing 76 is interposed between gear hub 74 and opening 46 through support member 12 to rotatably support the corresponding end of the spindle shaft and chuck assembly. The opposite end of the spindle shaft and chuck assembly is rotatably supported by means of an annular bearing 78 interposed between torque tube 14 and the corresponding end of spindle shaft 66. Wall portion 34 and the bounding flange 38 of support member 12 define a recess receiving gear 72 and providing a peripheral cover for the gear teeth, and gear 72 is adapted to be driven by a pinion 80 on the output shaft of a gear box unit 82 which, as schematically illustrated in FIG. 1 and described hereinafter, is mounted axially inwardly of support component 12 for the output shaft to be in axial alignment with opening 56 through support component 12.

In accordance with another aspect of the present invention, support for the tool carriage of a threading machine is achieved in a manner which promotes compactness of the machine and minimizing of the weight thereof. More particularly in this respect, openings 26 and 48 in support members 10 and 12 of the base are adapted to receive a support rail 84, and openings 28 and 50 in the support components are adapted to receive a support rail 86. Support rails 84 and 86 have outer portions 84a and 86a, respectively, extending axially forwardly of support component 12 to receive and support a tooling carriage 88 as schematically illustrated in FIG. 1. The underside of rail portion 84a is provided with teeth 90 which, as is well known, are engaged by a pinion on the tooling carriage which is rotatable by means of an operating handle 92 to achieve axial displacement of the tooling carriage toward and away from the end of a workpiece supported adjacent chuck 70. Outer portions 84a and 86a of the support rails are unsupported axially outwardly of support member 12 of the base construction and thus provide a cantilever configuration for supporting the carriage. Preferably, as best seen in FIGS. 3 and 4, support rails 84 and 86 are tubular in cross-section and are interengaged with the corresponding support member against axial and rotational displacement relative thereto by pins 94 extending through the flanges of the support members and the corresponding one of the support rails.

As schematically shown in FIGS. 1 and 4, support rail 86 advantageously provides a mounting support for an electric motor 96 by which gear box 82 is driven to rotate pinion gear 80, gear 72 and thus the spindle shaft and chuck assembly. More particularly in this respect, drive motor 96 is mounted on support rail 86 by suitable mounting straps 98, and the output shaft of the motor is coupled with the input shaft of gear box 82 by means of a pulley and drive belt arrangement 100. In connection with further use of the base to support component parts of the threading machine, and again as schematically shown in FIGS. 1 and 4, flange 40a of support member 12 is provided with an upstanding rib 102 behind wall portion 36 and the underside of the housing of gear box 82 is provided with a flange 104 which is adapted to be fastened to rib 102 by means of a nut and bolt assembly 106. Further, the output shaft of gear box 82 is surrounded by a collar portion 108 of the housing which extends into opening 56 in support component 12 and thus provides support for the output end of the gear box. Still further, torque tube 14 is provided with a mounting bracket 110 adjacent the axially inner end of gear box unit 82 and to which the latter end of the gear box is suitably attached for support. Accordingly, it will be appreciated that support for the various component parts of the threading machine is advantageously provided in a manner which utilizes the component parts of the base efficiently and economically.

Cover components which are not shown in the drawing, are removably mounted on the support members to cover the space therebetween for aesthetic purposes as well as for purposes of protecting personnel from injury and minimizing exposure of the component parts located between the support members. Preferably, a chip pan is supported beneath the carriage support rails between support member 12 and the outer ends of the rails for catching oil and metal chips during use of the machine. While such a chip pan is not shown in the drawings, it will be appreciated that the pan can be readily supported by attaching a wall thereof to wall portion 36 of support member 12 such as by the use of threaded fasteners and by supporting the outer end of the pan in suspension from the outermost ends of rail portions 84a and 86a. It will be appreciated of course that such cover and chip pan components have no load bearing function in connection with the threading machine.

While considerable emphasis has been placed herein on the specific structure and structural interrelationship between the component parts of the threading machine base, and the structural interrelationship between the base and support rails, it will be appreciated that other embodiments of the base construction and the provision of cantilevered support rails with a threading machine base, as well as changes in the preferred embodiment, will be obvious and suggested to those skilled in the art from the embodiment herein illustrated and described. Accordingly, it is to be distinctly understood that the foregoing descriptive matter is to be interpreted merely as illustrative of the present invention and not as a limitation.

Having thus described the invention, it is claimed:

1. A base for supporting a roatable spindle shaft and workpiece chuck means of a threading machine in which a workpiece to be threaded extends through said spindle shaft and is engaged by said chuck means at opposite ends of said spindle shaft for rotation therewith about an axis, said base comprising axially spaced apart support members transverse to said axis, torque tube means coaxial with said axis and extending between and rigidly connected to said support members, and a pair of support rails parallel to and laterally spaced from said tube means, said rails extending between said support members and axially outwardly beyond one of said support members to support threading machine tool means, said support members and torque tube means providing a passageway through said base for said spindle shaft, and said support members supporting said support rails for equal force loading relative to said axis whereby said torque tube means is torsionally loaded during threading of a workpiece by said tool means.

2. A base according to claim 1, wherein said support members are cast aluminum.

3. A base according to claim 1, wherein said torque tube means has opposite ends welded to said support members.

4. A base according to claim 1, wherein said support members are cast aluminum and said torque tube means is an aluminum tube.

5. A base according to claim 4, wherein said aluminum tube has opposite ends welded to said support member.

6. A base according to claim 1, wherein said support rails have outer ends spaced from said one support component, the portions of said rails between said one support component and said outer ends being supported only at said one support component.

7. A base according to claim 6, wherein said support rails are tubular.

8. A base according to claim 6, wherein said support members are cast aluminum.

9. A base according to claim 8, wherein said torque tube means has opposite ends welded to said support members.

10. A base according to claim 6, wherein said support members are cast aluminum and said torque tube means is an aluminum tube.

11. A base according to claim 10, wherein said aluminum tube has opposite ends welded to said support members.

12. A base according to claim 11, wherein said support rails are tubular.

13. A base according to claim 12, wherein said support rails extend through openings therefor in said support members, and pin means interengaging said rails and support members against relative displacement.

14. A threading machine comprising a base, spindle and chuck means supported on said base for rotation about an axis, and means to rotate said spindle and chuck means, said base comprising axially spaced apart support members transverse to said axis, torque tube means coaxial with said axis and extending between and rigidly connected to said support members, and a pair of support rails parallel to and laterally spaced from said tube means, said rails extending axially between said support members and having portions extending axially outwardly beyond one of said support members to support threading machine tool means, said spindle and chuck means including spindle shaft means coaxial with and extending through said torque tube means and chuck means on opposite ends of said shaft means, a workpiece to be threaded extending through said spindle shaft means and being engaged by said chuck means for rotation with said spindle and chuck means, said means to rotate said spindle and chuck means including drive means mounted on said base axially between said support members and said support members supporting said support rails for equal force loading relative to said axis, whereby said torque tube means is torsionally loaded during threading of a workpiece by said tool means.

15. A threading machine according to claim 14, and tool supporting carriage means on said portions of said support rails extending axially outwardly of said one support member.

16. A threading machine according to claim 14, wherein said drive means includes motor means and gear reducer means driven by said motor means, said motor means being mounted on one of said support rails and said gear reducer means being mounted on said torque tube means and said one support member.

17. A threading machine according to claim 14, wherein said support members are cast aluminum and said torque tube means is an aluminum tube having opposite ends welded to the corresponding one of said support members.

18. A threading machine according to claim 17, wherein said support rails extend through openings therefor in said support members, and pin means interengaging said rails and support members against relative displacement.

* * * * *